United States Patent
Zhang et al.

(10) Patent No.: US 10,813,188 B1
(45) Date of Patent: Oct. 20, 2020

(54) DIMMER WITH ZERO CROSSING DETECTOR AND METHOD OF CONTROLLING A DIMMER

(71) Applicant: EATON INTELLIGENT POWER LIMITED, Dublin (IE)

(72) Inventors: Haidong Zhang, Shanghai (CN); Lin Yang, Shanghai (CN); Lily Du, Shanghai (CN); Hoon Lee, Sugar Hill, GA (US); Kevin Zhong, Shanghai (CN)

(73) Assignee: EATON INTELLIGENT POWER LIMITED, Dublin (IE)

(*) Notice: Subject to any disclaimer, the term of this patent is extended or adjusted under 35 U.S.C. 154(b) by 0 days.

(21) Appl. No.: 16/683,476

(22) Filed: Nov. 14, 2019

(51) Int. Cl.
*H05B 45/10* (2020.01)
*H05B 45/37* (2020.01)

(52) U.S. Cl.
CPC ............ *H05B 45/37* (2020.01); *H05B 45/10* (2020.01)

(58) Field of Classification Search
None
See application file for complete search history.

(56) References Cited

U.S. PATENT DOCUMENTS

| 2014/0265935 A1* | 9/2014 | Sadwick | H05B 45/50 315/307 |
| 2015/0171762 A1* | 6/2015 | Chen | H02M 5/2573 323/311 |

* cited by examiner

*Primary Examiner* — Dedei K Hammond
(74) *Attorney, Agent, or Firm* — Eckert Seamans Cherin & Mellott, LLC

(57) ABSTRACT

A dimmer structured to be connected to a power source via a hot conductor and to a load via a load conductor includes a zero-crossing detector structured to generate a zero-crossing signal that that has a high state or a low state and changes states in response to a voltage between the hot conductor and the load conductor reaching or leaving zero volts only during a positive half-cycle of power received from the power source, a processing unit structured to receive the zero-crossing signal and to generate a triac control signal based on the zero-crossing signal, and a triac control unit including a triac and being structured to electrically connect between the hot conductor and the neutral conductor and to turn on and turn off the triac based on the triac control signal.

20 Claims, 4 Drawing Sheets

DIMMER WITH ZERO CROSSING DETECTOR AND METHOD OF CONTROLLING A DIMMER

BACKGROUND OF THE INVENTION

Field of the Invention

The disclosed concept relates generally to dimmers for use with a load, and in particular, to dimmers connected between hot and load conductors. The disclosed concept also relates to methods of controlling dimmers.

Background Information

Dimmers provide a dimming function for loads such as lights. Dimmers are generally placed between a power source and the load and control the nature of the power provided to the load. Very simple dimmers regulate the voltage provided to the load by, for example, dividing the voltage using a variable resistor. However, dimming in this manner is inefficient as remaining power not provided to the load is dissipated as heat.

More recent dimmers cut off a part of each half-cycle of the power provided to the load. In some dimmers, the cut off is from a predetermined time into a half-cycle until a zero crossing in the power. Changing the predetermined time changes the amount of dimming, as more or less of the half-cycle of power is cutoff from reaching the load. Cutting off a part of the half-cycle can be accomplished using a circuit component such as a triac. The more recent dimmers provide increased power efficiency over prior dimmers that used a variable resistor. The power efficiency of a dimmer is a significant concern.

The use of dimmers with some types of light emitting diodes (LEDs) causes the LEDs to flicker. Additionally, it can be difficult to detect the zero-crossing in power while the dimmer is operating.

There is room for improvement in dimmers.

There is also room for improvement in methods of controlling dimmers.

SUMMARY OF THE INVENTION

These needs, and others, are met by at least one embodiment of the disclosed concept in which a dimmer includes zero-crossing detector structured to change states in response to a voltage between a hot conductor and load conductor reaches zero volts only during a positive half-cycle of power received from a power source. These needs, and others, are met by at least one embodiment of the disclose concept in which a dimmer includes a snubber circuit that is turned on for a predetermined period before a zero-crossing in supplied power.

In accordance with an aspect of the disclosed concept, a dimmer structured to be connected to a power source via a hot conductor and to a load via a load conductor comprises: a zero-crossing detector structured to generate a zero-crossing signal that that has a high state or a low state and changes states in response to a voltage between the hot conductor and the load conductor reaching or leaving zero volts only during a positive half-cycle of power received from the power source; a processing unit structured to receive the zero-crossing signal and to generate a triac control signal based on the zero-crossing signal; and a triac control unit including a triac and being structured to electrically connect between the hot conductor and the neutral conductor and to turn on and turn off the triac based on the triac control signal.

In accordance with an aspect of the disclosed concept, a dimmer structured to be connected to a power source via a hot conductor and to a load via a load conductor comprises: a zero-crossing detector structured to generate a zero-crossing signal that that has a high state or a low state and changes states in response to a voltage between the hot conductor and the load conductor reaching or leaving zero volts only during a positive half-cycle of power received from the power source; a snubber structured to electrically connect to the hot conductor and the load conductor, to have an on state in which a capacitance is electrically coupled to the hot conductor and the load conductor, and to have an off state in which the capacitance is electrically de-coupled from the hot conductor and the load conductor; and a processing unit structured to receive the zero-crossing signal and to generate a snubber control signal operable to cause the snubber to change to the on state a predetermine time before a zero-crossing in the power received from the power source and to change to the off state at the zero-crossing in the power received from the power source based on the zero-crossing signal.

In accordance with an aspect of the disclosed concept, a method of controlling a dimmer structured to be connected to a power source via a hot conductor and to a load via a load conductor comprises: determining that a voltage between the hot conductor and the neutral conductor reaches or leaves zero volts during a positive half-cycle of power received from the power source; changing a state of a zero-crossing signal in response to determining that the voltage between the hot conductor and the neutral conductor reaches or leaves zero volts during the positive half-cycle of power received from the power source; generating a triac control signal based on the zero-crossing signal; turning on a snubber a predetermined time before a zero-crossing in the power received from the power source based on the zero-crossing signal; and turning off the snubber at the zero-crossing in the power received from the power source based on the zero-crossing signal.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
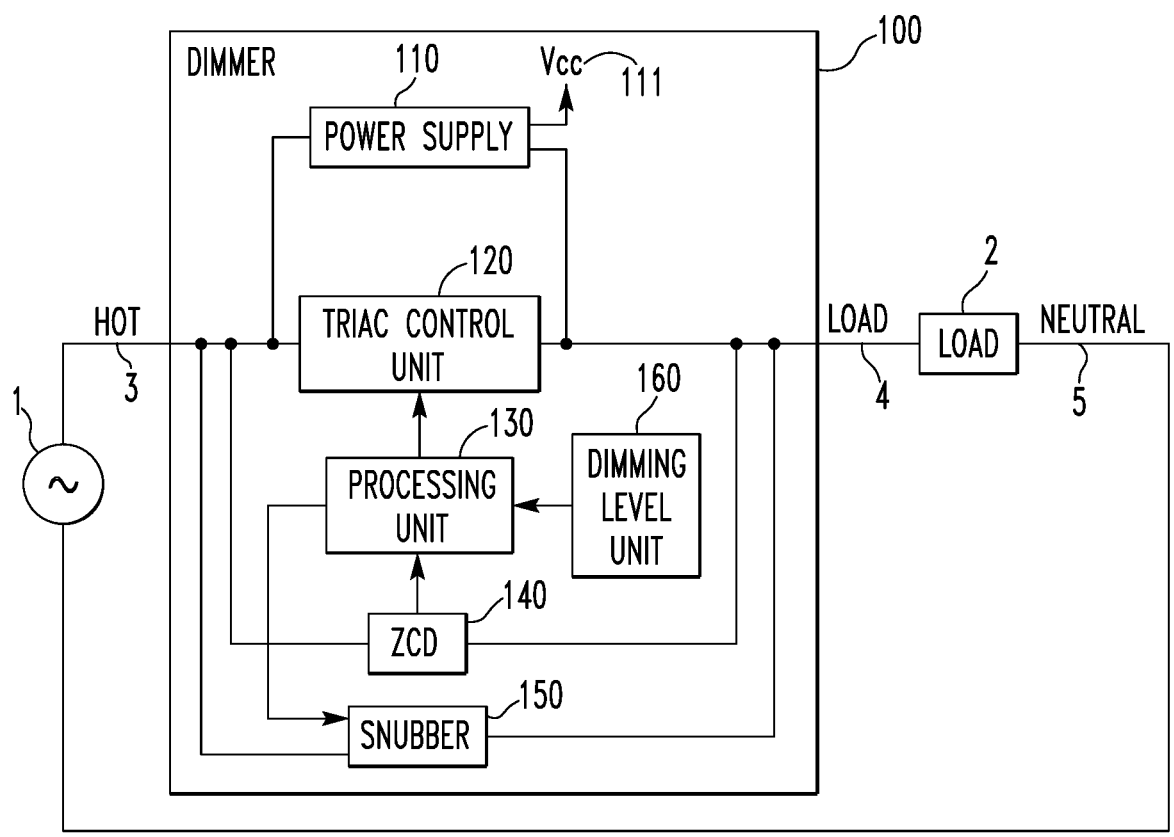
FIG. 1 is a schematic diagram of a dimmer system including a dimmer in accordance with an example embodiment of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the term "number" shall mean one or an integer greater than one (i.e., a plurality).

FIG. 1 is a schematic diagram of a dimmer system including a dimmer 100 in accordance with an example embodiment of the disclosed concept. The dimmer system includes the dimmer 100, a power source 1 and a load 2. The power source 1 is electrically connected to the dimmer 100 by a HOT conductor 3 and to the load 2 by a NEUTRAL conductor 5. The dimmer 100 is electrically connected to the load 2 by a LOAD conductor 4. The power source 1, dimmer 100, and load 2 are electrically connected in series. The power source 1 may be, for example, utility power such as residential or commercial 120 VAC power. The load 2 may be, for example, one or more lights such as, without limitation, light emitting diodes (LEDs).

The dimmer 100 is operable to control dimming of the load 2. For example and without limitation, the dimmer 100 may implement phase-control dimming of the load 2 by cutting off a portion of the waveform provided by the power source 1 before providing it to the load 2. In some example embodiments of the disclosed concept, the dimmer 100 implements reverse-phase control dimming of the load 2 where the trailing edge of each half-cycle of power from the power source 1 is cutoff before being provided to the load 2.

The dimmer 100 includes a power supply 110, a triac control unit 120, a processing unit 130, a zero-crossing detector 140, a snubber 150, and a dimming level unit 160.

The power supply 110 is electrically connected to the HOT conductor 3 and the LOAD conductor 4 and is electrically connected in parallel with the triac control unit 120. The power supply 110 is structured to convert AC power from the power source 1 to supply voltage 111 (Vcc) for use by components of the dimmer 100 such as the processing unit 130, the zero-crossing detector 140, and the dimming level unit 160. In some example embodiments, the supply voltage 111 may be 5V. However, it will be appreciated that other voltage values may be used as the supply voltage 111 without departing from the scope of the disclosed concept.

Figure 2:
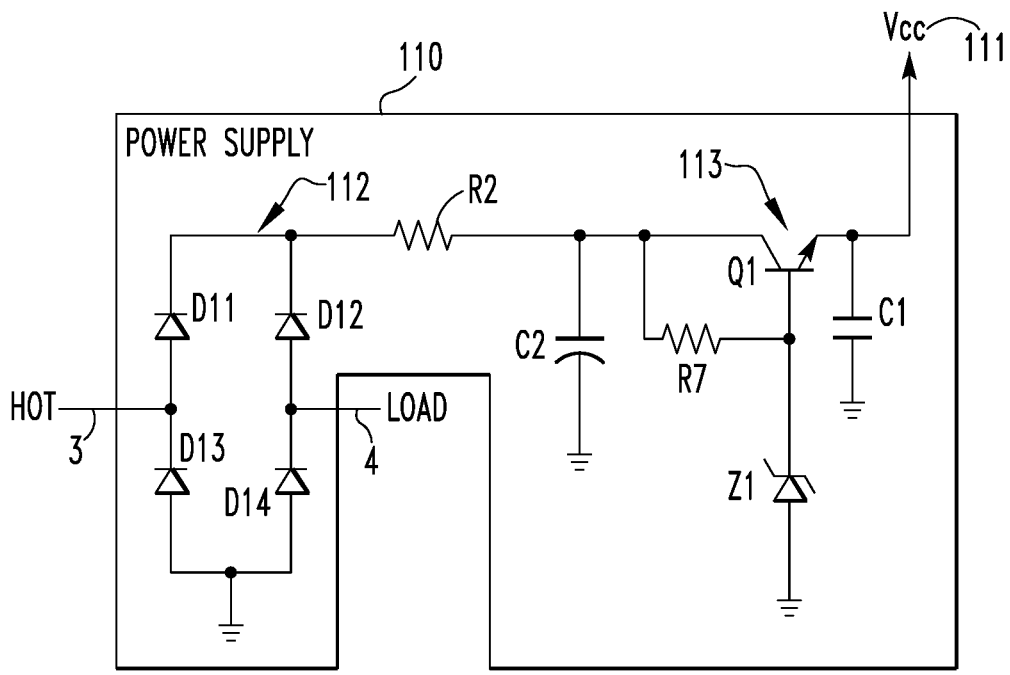
FIG. 2 is a circuit diagram of a power supply in accordance with an example embodiment of the disclosed concept.

FIG. 2 is a circuit diagram of the power supply 110 in accordance with an example embodiment of the disclosed concept. The power supply 110 includes a bridge circuit 112 including four diodes D11,D12,D13,D14 arranged as a bridge rectifier and electrically connected between the HOT conductor 3 and the LOAD conductor 4. The bridge circuit 112 is structured to convert AC power received via the HOT conductor 3 or the LOAD conductor 4 to DC power. The power supply 110 also includes a current limiting resistor R2 electrically connected to the bridge circuit 112. The current limiting resistor R2 limits the amount of current output by the bridge circuit 112 and supplied to components of the dimmer 100. The current limiting resistor R2 is also electrically connected to a first capacitor C2 which stores energy and smoothes the output of the bridge circuit 112.

The power supply 110 further includes a voltage limiting circuit 113 that includes a resistor R7, a switch Q1 (e.g., without limitation, a transistor such as a bipolar junction transistor), and a zener diode Z1. The voltage limiting circuit 113 is structured to limit the voltage output of the power supply 110 to the determined level of the supply voltage 111 (e.g., without limitation, 5V). The breakdown voltage characteristics of the zener diode Z1 and the resistance value of the resistor R7 may be selected based on the desired supply voltage 111. The power supply 110 also includes a second capacitor C1 that is electrically connected to the voltage limiting circuit 113. The second capacitor C1 may also store energy and smooth the output of the voltage limiting circuit 113. The output of the power supply 110 is the supply voltage 111 that may be provided to other components of the dimmer 100 such as the processing unit 130, the zero-crossing detector 140, and the dimming level unit 160.

While the circuit diagram of FIG. 2 illustrates an example embodiment of the power supply 110, it will be appreciated that modifications may be made to the illustrated circuit without departing from the scope of the disclosed concept.

Referring back to FIG. 1, the triac control unit 120 is electrically connected between the HOT conductor 3 and the LOAD conductor 4. The triac control unit 120 is structured to regulate power provided to the load 2 as part of the dimmer 100 providing the dimming function. The triac control unit 120 may include a triac that is turned on and off at selected times in order to cutoff the power provided to the load 2 at selected times. For example, the triac may be turned on and off in order to implement phase control dimming of the load 2.

Figure 3:
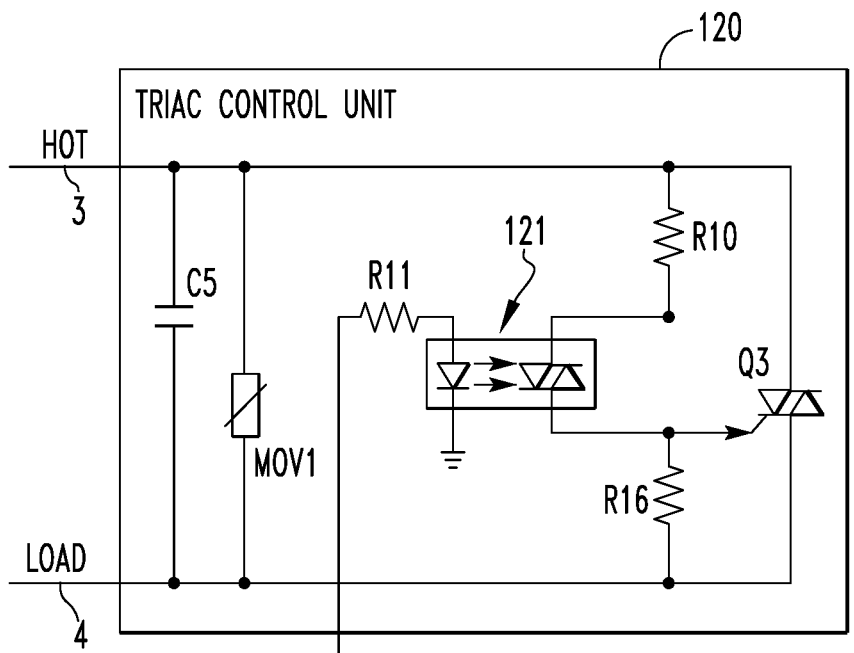
FIG. 3 is a circuit diagram of a triac control unit in accordance with an example embodiment of the disclosed concept.

FIG. 3 is a circuit diagram of the triac control unit 120 in accordance with an example embodiment of the disclosed concept. The triac control unit 120 is electrically connected to the HOT conductor 3 and the LOAD conductor 4. The triac control unit 120 includes a triac Q3 electrically connected between the HOT conductor 3 and the LOAD conductor 4. Turning on the triac Q3 allows power to flow through the triac Q3 from the HOT conductor 3 to the LOAD conductor 4 and vice versa. Turning off the triac Q3 prevents power from flowing through the triac Q3 from the HOT conductor 3 to the LOAD conductor 4 and vice versa.

The state of the triac Q3 is controlled via a triac control signal (TRIAC) received from the processing unit 130. An opto-coupler 121 included in the triac control circuit 121 is turned on or off by the triac control signal. In turn, the output of the opto-coupler 121 turn on or turns off the triac Q3. A first resistor R11 may be electrically connected to the input of the opto-coupler 121 and second and third resistors R10,R16 may be electrically connected to the output of the opto-coupler 121. A gate of the triac Q3 may also be connected to the output of the triac Q3 while the HOT and LOAD conductors 3,4 are electrically connected to anodes of the triac Q3. The second and third resistors R10,R16 may be electrically connected between the HOT and LOAD conductors 3,4 and operate as a voltage divider to turn on the triac Q3 when the opto-coupler 121 is turned on in response to the triac control signal. The triac control unit 120 may also include a capacitor C5 and a metal oxide varistor MOV1 electrically connected between the HOT and LOAD conductors 3,4.

While the circuit diagram of FIG. 3 illustrates an example embodiment of the triac control unit 120, it will be appreciated that modifications may be made to the illustrated circuit without departing from the scope of the disclosed concept.

Referring back to FIG. 1, the dimmer 100 also includes the processing unit 130. The processing unit 130 is structured to receive the supply voltage 111 from the power supply 110, which may be used to power the processing unit 130. The processing unit 130 may include a processor and a memory. The processor may be, for example and without limitation, a microprocessor, a microcontroller, or some other suitable processing device or circuitry, that interfaces with the memory. The memory can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The processing unit 130 is structured to receive and provide one or more control signals to control functionality of the dimmer 100.

For example, the processing unit 130 is also structured to receive one or more dimming control signals from the dimming level unit 160 to indicate the desired level of dimming. The processing unit 130 is also structured to output the triac control signal to the triac control unit 120 in order to cause the triac control unit 120 to control the dimming of the load 2. The processing unit 120 is also structured to receive a zero-crossing signal from the zero-crossing detector 140. The zero-crossing signal may be used by the processing unit 130 to determine the timing of the triac control signal. In some example embodiments, the zero-crossing signal is indicative of the zero-crossing in power received from the power source 1. The level of dimming may be controlled based on the amount of time the triac control signal is output after a zero-crossing in the power received from the power source 1. For example, the power supplied to the load 2 may be cutoff for a certain amount of time each half-cycle based on the timing of the triac control signal.

The processing unit 130 is also structured to output a snubber control signal to the snubber 150 to turn on or turn off the snubber 150. In some example embodiments of the disclosed concept, the processing unit 130 is structured to use the snubber control signal to turn on the snubber 150 a predetermined time before a zero-crossing in the power received from the power source 1 and to turn off the snubber 150 at the zero-crossing in power received from the power source 1. Turning on the snubber 150 results in the snubber 150 coupling a capacitance between the HOT and NEUTRAL conductors 3,4. Turning on the snubber 150 the predetermined time before the zero-crossing in power received from the power source 1 and turning off the snubber 150 at the zero-crossing removes a flickering in the load 2 that arises near zero-crossings without reducing inefficiencies caused by constantly having the snubber 150 turned on.

Figure 4:
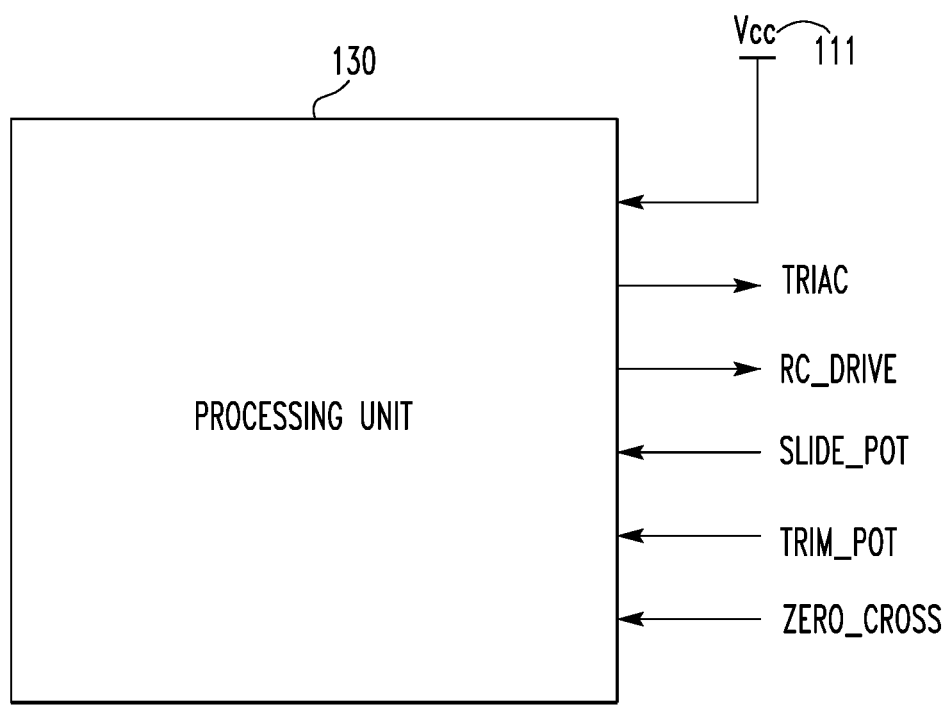
FIG. 4 is a schematic diagram of a processing unit in accordance with an example embodiment of the disclosed concept.

FIG. 4 is a schematic diagram of the processing unit 130 in accordance with an example embodiment of the disclosed concept. The processing unit 130 is structured to receive the supply voltage 111 from the power supply 110. The processing unit 130 is structured to receive dimming control signals (SLIDE_POT and TRIM_POT) from the dimming level unit 160, which indicate the desired level of dimming. The processing unit 130 also receives the zero-crossing signal (ZERO_CROSS) from the zero-crossing detector 140, which is indicative of zero-crossings in the power received from the power source 1. The processing unit 130 is structured to generate and output the triac control signal (TRIAC) to the triac control unit 120 and the snubber control signal (RC_DRIVE) to the snubber 150. The triac control signal is operable to cause the triac control unit 120 to turn on and off the triac Q3 at selected times. The snubber control signal is operable to cause the snubber 150 to turn on and off. It will be appreciated that the processing unit 130 may receive and output other signals without departing from the scope of the disclosed concept.

Referring back to FIG. 1, the zero-crossing detector 140 is electrically connected to the HOT and LOAD conductors 3,4 and is structured to sense zero-crossings in the voltage between the HOT and LOAD conductors 3,4. The zero-crossing detector 140 is structured to output the zero-crossing signal which is indicative of a zero-crossing in the power received from the power source 1.

It can be difficult to detect the zero-crossing in the power received from the power source 1 when the dimmer 100 is operating based on the voltage between the HOT and LOAD conductors 3,4 because when the triac Q3 of the triac control unit 120 is on, the voltage between the HOT and LOAD conductors 3,4 is zero. The zero-crossing detector 140 is thus structured to generate and output the zero-crossing signal which changes state only in response to the voltage between the HOT and LOAD conductors 3,4 reaching or leaving 0V during the positive half-cycle of power received from the power source 1. When the voltage between the HOT and LOAD conductors 3,4 reaches or leaves 0V during the negative half-cycle of the power received from the power source 1, the zero-crossing signal does not change states. As a result, during operation of the dimmer 100, the zero-crossing signal will change states (e.g., change from a high state to a low state) at or a predetermined time after the zero-crossing beginning the positive half-cycle of the power received from the power source 1. This change in states of the zero-crossing signal may be used by the processing unit 130 to set the timing of the triac control signal.

Figure 5:
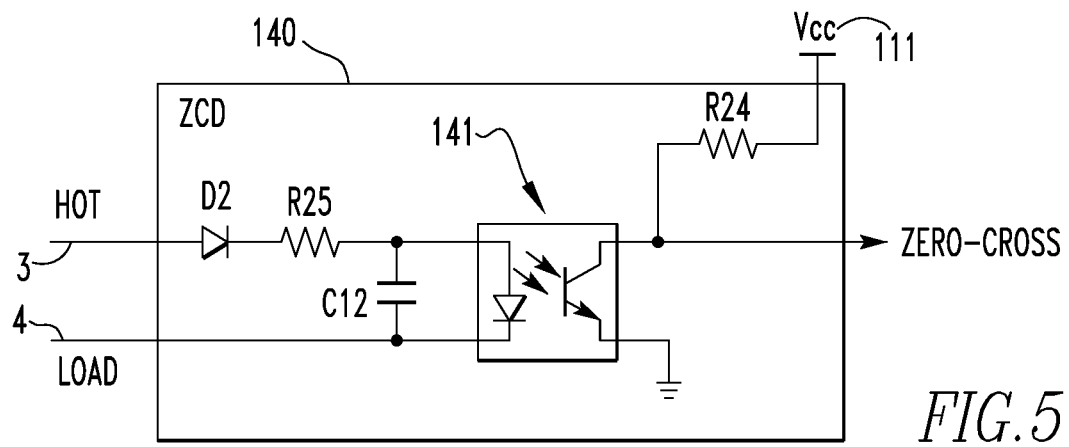
FIG. 5 is a circuit diagram of a zero-crossing detector in accordance with an example embodiment of the disclosed concept.

FIG. 5 is a circuit diagram of the zero-crossing detector 140 in accordance with an example embodiment of the disclosed concept. The zero-crossing detector 140 is electrically connected to the HOT and LOAD conductors 3,4. The HOT conductor 3 is electrically connected to a diode D2 arranged such that power can only be conducted through the diode D2 during the positive half-cycle of power received from the HOT conductor 3. The zero-crossing detector 141 includes an opto-coupler 141 electrically connected to the HOT and LOAD conductors 3,4. The opto-coupler 141 is structured to turn on in response to a positive voltage between the HOT and LOAD conductors 3,4. The outputs of the opto-coupler 141 are electrically connected between the supply voltage 111 and ground (GND). A resistor R24 is electrically connected between the supply voltage 111 and the output of the opto-coupler 141. As a result, when the opto-coupler 141 is turned on (i.e., when the voltage between the HOT and LOAD conductors 3,4 is positive), the zero-crossing signal has a low state (e.g., 0V). When the opto-coupler 141 is turned off (i.e., when the voltage between the HOT and LOAD conductors is not positive), the zero-crossing signal has a high state (e.g., the supply voltage 111, 5V, etc.). Thus, the state of the zero-crossing signal changes only when the power received from the power source 1 reaches zero during a positive half-cycle and is not affected during the negative half-cycle. In some example embodiments, the zero-crossing detector 140 may include a resistor R25 and capacitor C12 connected to inputs of the opto-coupler 141.

While the circuit diagram of FIG. 5 illustrates an example embodiment of the zero-crossing detector 140, it will be appreciated that modifications may be made to the illustrated circuit without departing from the scope of the disclosed concept.

Referring back to FIG. 1, the snubber 150 is electrically connected to the HOT and LOAD conductors 3,4. The snubber 150 is structured to turn on and turn off in response to the snubber control signal received from the processing unit 130. When the snubber 150 is turned on, it couples the HOT and LOAD conductors 3,4 to a capacitance and when the snubber 150 is turned off, it de-coupled the HOT and LOAD conductors 3,4 from the capacitance. As previously described, the snubber control signal is structured to turn on the snubber 150 a predetermined time before a zero-crossing in the power received from the power source 1 and to turn off at the zero-crossing, which removes a flickering in the load 2 that arises near zero-crossings without reducing inefficiencies caused by constantly having the snubber 150 turned on.

Figure 6:
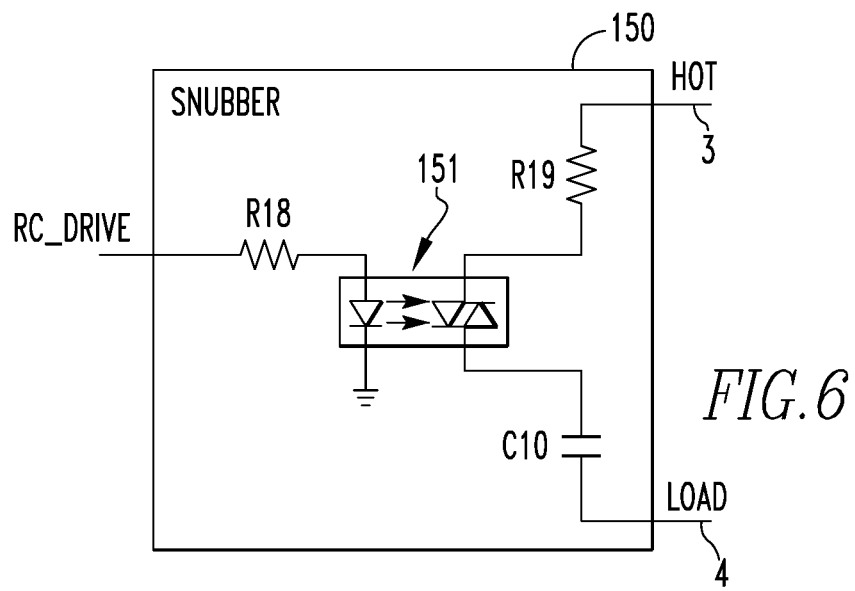
FIG. 6 is a circuit diagram of a snubber in accordance with an example embodiment of the disclosed concept.

FIG. 6 is a circuit diagram of the snubber 150 in accordance with an example embodiment of the disclosed concept. The snubber 150 is structured to receive the snubber control signal (RC_DRIVE) from the processing unit 130. The snubber 150 includes an opto-coupler 151 structured to receive the snubber control signal at its input. The snubber control signal is operable to turn on and turn off the opto-coupler 151. The outputs of the opto-coupler 151 are electrically connected between the HOT and LOAD conductors 3,4. A resistor R19 is electrically connected between one output of the opto-coupler 151 and the HOT conductor 3 and a capacitor C10 is electrically connected between the other output of the opto-coupler 151 and the LOAD conductor 4. As a result, turning on the opto-coupler 151 couples the capacitance provided by the capacitor C10 to the HOT and LOAD conductors 3,4, which removes flickering in the load 2 that arises near zero-crossings. In some example embodiments, the snubber 150 may also include a resistor R18 electrically connected to an input of the opto-coupler 151.

While the circuit diagram of FIG. 6 illustrates an example embodiment of the snubber 150, it will be appreciated that modifications may be made to the illustrated circuit without departing from the scope of the disclosed concept.

Referring back to FIG. 1, the dimming level unit 160 is structured to output one or more dimming control signals to the processing unit 130 to indicate the desired level of dimming. The dimming level unit 160 may include circuitry associated with physical controls that may be interacted with by a user to indicate the desired level of dimming. For example, the dimmer 100 may include sliders, knobs, buttons, or other control elements that a user may interact with to indicate a desired level of dimming. The dimming level unit 160 may include circuitry associated with these elements and structured to convert the interaction into one or more dimming control signal which are output to the processing unit 130 to indicate the desired level of dimming. In response to the one or more dimming control signals, the processing unit 130 may generate the triac control signal with timing associated with the desired level of dimming.

Figure 7:
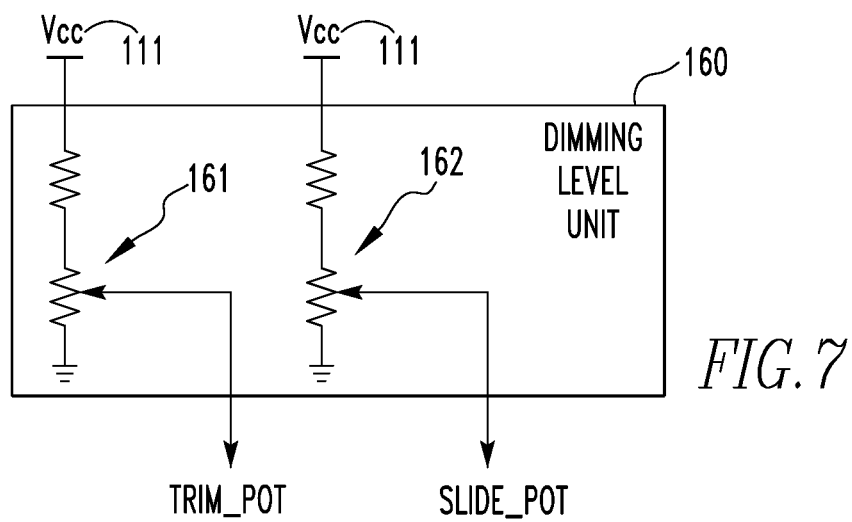
FIG. 7 is a circuit diagram of a dimming level unit in accordance with an example embodiment of the disclosed concept.

FIG. 7 is a circuit diagram of the dimming level unit 160 in accordance with an example embodiment of the disclosed concept. The dimming level unit 160 is structured to receive the supply voltage 111 from the power supply 110. The dimming level unit 160 includes a trimming potentiometer 161 and a slide potentiometer 162. The trimming potentiometer 161 may be used, for example, to calibrate the level of dimming and the slide potentiometer 162 may be used to adjust the level of dimming. The trimming potentiometer 161 and the slide potentiometer 162 may be responsive to interaction with control elements of the dimmer 100 such as a knob or slider. The trimming potentiometer 161 and the slide potentiometer 162 output dimming control signals (TRIM_POT and SLIDE_POT) to the processing unit 130, which in turn generates the triac control signal based on these dimming control signals.

While the circuit diagram of FIG. 7 illustrates an example embodiment of the dimming level unit 160, it will be appreciated that modifications may be made to the illustrated circuit without departing from the scope of the disclosed concept.

Figure 8:
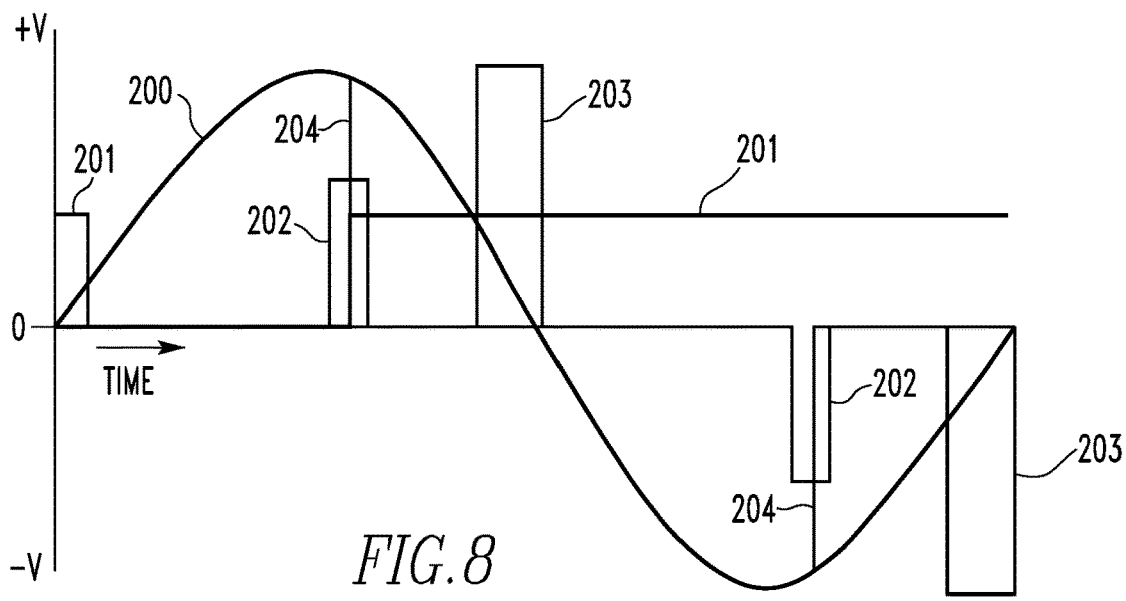
FIG. 8 is a waveform diagram in accordance with an example embodiment of the disclosed concept.

FIG. 8 is a waveform diagram in accordance with an example embodiment of the disclosed concept. FIG. 8 illustrates various waveforms during a positive and negative half-cycle of the power received from the power source 1. The waveforms include the voltage of the power source 1 (200), the zero-crossing signal 201 output by the zero-crossing detector 140, the triac control signal 202 output by the processing unit 120, the snubber control signal 203 output by the processing unit 120, and the voltage between the HOT and LOAD conductors 3,4 (204). The voltage levels of the waveforms are not drawn to scale, but rather are for purposes of illustration.

As shown in FIG. 8, at the beginning of the positive half-cycle, the zero-crossing signal 201 has a high state that changes to a low state shortly after the beginning of the half-cycle. This drop is indicative of the zero-crossing starting the positive half-cycle in the power received from the power source 1 (200) and can be used by the processing unit 120 to determine the timing of the triac control signal 202. A predetermined time into the positive half-cycle, the triac control signal 202 changes to a high state, which causes the triac Q3 to turn on. During the first part of the positive half-cycle the voltage between the HOT and LOAD conductors 3,4 (204) is the same as the power received from the power source 1 (200). When the triac Q3 turns on, the voltage between the HOT and LOAD conductors 3,4 (204) drops to zero, as shown in FIG. 8. The drop in the voltage between the HOT and LOAD conductors 3,4 (204) causes the zero-crossing signal 201 to change states from the low state to the high state because the voltage between the HOT and LOAD conductors 3,4 (204) has reached zero during a positive half-cycle. The zero-crossing signal 201 remains in the high state throughout the remainder of the positive half-cycle and through the negative half-cycle because the voltage between the HOT and LOAD conductors 3,4 (204) does not again reach zero during the positive half-cycle. Rather, the voltage between the HOT and LOAD conductors 3,4 (204) remains at zero until the beginning of the negative half-cycle where it begins following the power received from the power source 1 (200) until the triac control signal 202 turns on the triac Q3 during the negative half-cycle and causes the voltage between the HOT and LOAD conductors 3,4 to go from its negative voltage value to zero. At the beginning of the next positive half-cycle, the zero-crossing signal 201 again changes to the low state indicating the zero-crossing beginning the positive half cycle. In this manner, the processing unit 120 can use the zero-crossing signal 201 to determine the zero-crossing beginning each cycle of power received from the power source 1 (200), which can be used to determine the timing of the triac control signal 202 and the snubber control signal 203.

As shown in FIG. 8, the snubber control signal 203 changed to a high state a predetermined time before each zero-crossing in the power received from the power source 1 (200) and then changes to a low state at each zero-crossing. In this manner, the snubber control signal can be used to control the snubber 150 to turn on the predetermined time before each zero-crossing in the power received from the power source 1 (200) and then turned off at the zero-crossing.

Figure 9:
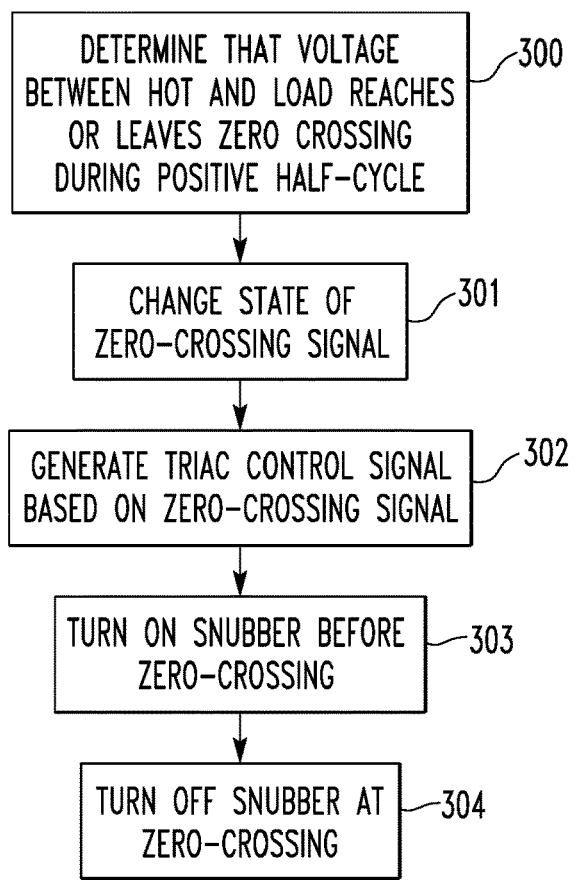
FIG. 9 is a flowchart of a method of controlling a dimmer in accordance with an example embodiment of the disclosed concept.

FIG. 9 is flowchart of a method of controlling a dimmer in accordance with an example embodiment of the disclosed concept. The method may be implemented, for example, in the dimmer 100. The method begins at 300 with determining that a voltage between a hot and a load conductor reaches or leaves zero volts during a positive half-cycle in power received from a power source. In response to determining that the voltage between the hot and load conductors reaches or leaves zero volts during the positive half-cycle in power received from the power source, the state of a zero-crossing signal is changed at 301. Steps 300 and 301 may be implemented, for example, by the zero-crossing detector 140.

At 302, a triac control signal is generated based on the zero-crossing signal. The zero-crossing signal is indicative of the beginning of a cycle of power received from the power source and may be used to place the triac control signal at predetermined times during that cycle.

At 303, a snubber is turned on a predetermined time before a zero-crossing in power received from the power source and at 304 the snubber is turned off at the zero-crossing in the power received from the power source. Steps 303 and 304 may be based on the zero-crossing signal as it is indicative of the start of a cycle in power received from the power source. Steps 302, 303, and 304 may be implemented, for example, by the processing unit 130.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A dimmer structured to be connected to a power source via a hot conductor and to a load via a load conductor, the dimmer comprising:
   a zero-crossing detector structured to generate a zero-crossing signal that has a high state or a low state and changes states in response to a voltage between the hot conductor and the load conductor reaching or leaving zero volts only during a positive half-cycle of power received from the power source;
   a processing unit structured to receive the zero-crossing signal and to generate a triac control signal based on the zero-crossing signal; and
   a triac control unit including a triac and being structured to electrically connect between the hot conductor and the load conductor and to turn on and turn off the triac based on the triac control signal.

2. The dimmer of claim 1, further comprising:
   a snubber structured to electrically connect to the hot conductor and the load conductor, to have an on state in which a capacitance is electrically coupled to the hot conductor and the load conductor, and to have an off state in which the capacitance is electrically de-coupled from the hot conductor and the load conductor,
   wherein the processing unit is structured to generate a snubber control signal operable to cause the snubber to change to the on state a predetermined time before a zero-crossing in the power received from the power source and to change to the off state at the zero-crossing in the power received from the power source.

3. The dimmer of claim 2, wherein the snubber includes an opto-coupler structured to turn on or off in response to the snubber control signal and a capacitor structured to provide the capacitance,
   wherein turning on the opto-coupler allows power to flow between the hot conductor and the load conductor through the capacitor, and
   wherein turning off the opto-coupler prevents power from flowing between the hot conductor and the load conductor through the capacitor.

4. The dimmer of claim 1, wherein the zero-crossing detector is structured to electrically connect to the hot conductor and the load conductor,
   wherein the zero-crossing detector includes an opto-coupler structured to turn on when the voltage between the hot conductor and the load conductor is positive and to turn off when the voltage between the hot conductor and the load conductor is not positive, and
   wherein turning on or turning off the opto-coupler causes the zero-crossing signal to change states.

5. The dimmer of claim 4, wherein the zero-crossing detector includes a diode structured to electrically connect between the hot conductor and the opto-coupler such that power can only be conducted through the diode to the opto-coupler when the voltage between the hot conductor and the load conductor is positive.

6. The dimmer of claim 4, wherein an output of the opto-coupler is electrically connected between a supply voltage and ground.

7. The dimmer of claim 1, further comprising:
   a power supply structured to receive alternating current power from the power source and to generate a supply voltage having a direct current using the alternating current power from the power source.

8. The dimmer of claim 7, wherein the power supply includes a bridge circuit, a current limiting resistor, and a voltage limiting circuit.

9. The dimmer of claim 1, wherein the triac control unit includes an opto-coupler structured to turn on or turn off in response to the triac control signal,
   wherein turning on the opto-coupler causes the triac to turn on and allow power to flow through the triac from the hot conductor to the load conductor, and
   wherein turning off the opto-coupler causes the triac to turn off and prevent power from flowing through the triac from the hot conductor to the load conductor.

10. The dimmer of claim 1, further comprising:
    a dimming level unit structured to generate one or more dimming control signals indicative of a desired dimming level and to output the one or more dimming control signals to the processing unit,
    wherein the processing unit is structured to generate the triac control signal based on the zero-crossing signal and the one or more dimming control signals.

11. The dimmer of claim 10, further comprising:
    one or more control elements structured to be interacted with by a user,
    wherein the dimming level unit is structured to generate the one or more dimming control signals based on interaction with the one or more control elements by the user.

12. The dimmer of claim 11, wherein the one or more control elements include a slider.

13. The dimmer of claim 1, wherein the processing unit is structured to generate the triac control signal to implement phase control dimming of the load.

14. A dimmer structured to be connected to a power source via a hot conductor and to a load via a load conductor, the dimmer comprising:
  a zero-crossing detector structured to generate a zero-crossing signal that has a high state or a low state and changes states in response to a voltage between the hot conductor and the load conductor reaching or leaving zero volts only during a positive half-cycle of power received from the power source;
  a snubber structured to electrically connect to the hot conductor and the load conductor, to have an on state in which a capacitance is electrically coupled to the hot conductor and the load conductor, and to have an off state in which the capacitance is electrically de-coupled from the hot conductor and the load conductor; and
  a processing unit structured to receive the zero-crossing signal and to generate a snubber control signal operable to cause the snubber to change to the on state a predetermined time before a zero-crossing in the power received from the power source and to change to the off state at the zero-crossing in the power received from the power source based on the zero-crossing signal.

15. The dimmer of claim 14, wherein the snubber includes an opto-coupler structured to turn on or off in response to the snubber control signal and a capacitor structured to provide the capacitance, wherein turning on the opto-coupler allows power to flow between the hot conductor and the load conductor through the capacitor, and wherein turning off the opto-coupler prevents power from flowing between the hot conductor and the load conductor through the capacitor.

16. The dimmer of claim 14, further comprising:
  a triac control unit including a triac and being structured to electrically connect between the hot conductor and the neutral conductor and to turn on and turn off the triac based on a triac control signal.

17. The dimmer of claim 15, further comprising:
  a dimming level unit structured to generate one or more dimming control signals indicative of a desired dimming level and to output the one or more dimming control signals to the processing unit,
  wherein the processing unit is structured to generate the triac control signal based on the zero-crossing signal and the one or more dimming control signals.

18. The dimmer of claim 14, wherein the zero-crossing detector is structured to electrically connect to the hot conductor and the load conductor,
  wherein the zero-crossing detector includes an opto-coupler structured to turn on when the voltage between the hot conductor and the load conductor is positive and to turn off when the voltage between the hot conductor and the load conductor is not positive, and
  wherein turning on or turning off the opto-coupler causes the zero-crossing signal to change states.

19. The dimmer of claim 18, wherein the zero-crossing detector includes a diode structured to electrically connect between the hot conductor and the opto-coupler such that power can only be conducted through the diode to the opto-coupler when the voltage between the hot conductor and the load conductor is positive.

20. A method of controlling a dimmer structured to be connected to a power source via a hot conductor and to a load via a load conductor, the method comprising:
  determining that a voltage between the hot conductor and the neutral conductor reaches or leaves zero volts during a positive half-cycle of power received from the power source;
  changing a state of a zero-crossing signal in response to determining that the voltage between the hot conductor and the load conductor reaches or leaves zero volts during the positive half-cycle of power received from the power source;
  generating a triac control signal based on the zero-crossing signal;
  turning on a snubber a predetermined time before a zero-crossing in the power received from the power source based on the zero-crossing signal; and
  turning off the snubber at the zero-crossing in the power received from the power source based on the zero-crossing signal.

* * * * *